United States Patent [19]

McAskill

[11] Patent Number: 5,557,978
[45] Date of Patent: Sep. 24, 1996

[54] COUNTERSHAFT POWER TRANSMISSION

[75] Inventor: John P. McAskill, Coffeyville, Kans.

[73] Assignee: Deere & Company, Moline, Ill.

[21] Appl. No.: 399,782

[22] Filed: Mar. 7, 1995

[51] Int. Cl.$^6$ ........................................... F16H 3/08
[52] U.S. Cl. ................... 74/331; 74/325; 74/333
[58] Field of Search ........................ 174/325, 331, 174/333, 359, 360

[56] References Cited

U.S. PATENT DOCUMENTS

| | | | |
|---|---|---|---|
| 4,658,662 | 4/1987 | Rundle | 74/331 |
| 4,726,246 | 2/1988 | Whalen | 74/333 |
| 4,788,889 | 12/1988 | Davis et al. | 74/331 X |
| 4,823,639 | 4/1989 | Krause et al. | 74/333 X |
| 4,846,009 | 7/1989 | Paluska, Jr. | 74/331 |
| 5,249,475 | 10/1993 | McAskill | 74/331 |
| 5,421,222 | 6/1995 | Stine et al. | 74/331 X |
| 5,465,630 | 11/1995 | Iwamoto | 74/331 |
| 5,471,892 | 12/1995 | Sherman | 74/331 X |

*Primary Examiner*—Charles A. Marmor
*Assistant Examiner*—Peter Kwon

[57] ABSTRACT

In a transmission, an input set of rotatable gears is meshed with an input gear that is fixed to an input shaft which receives input. Through an arrangement of shafts and gears, any selected rotatable gear of the input set can be fixed to its shaft and drivingly connected to any selected one of a set of gear ratio combinations that are formed using a plurality of the gears in order to provide speeds at an output end of an output shaft for output. A gear ratio sequence, formed by drivingly connecting a plurality of the gears, provides a decrease in speed for at least one of the gear ratio combinations and an increase in speed for at least one other of the gear ratio combinations. A middle range of speeds for the output includes at least one speed that is lower than at least one of a low range of speeds for the output and at least one other speed that is higher than at least one of a high range of speeds for the output.

22 Claims, 5 Drawing Sheets

COUNTERSHAFT POWER TRANSMISSION

TECHNICAL FIELD

The invention relates generally to countershaft transmissions, and more particularly to countershaft transmissions having a large number of speeds suitable for use in work vehicles such as agricultural tractors and industrial equipment. The invention further relates to methods of providing such speeds.

BACKGROUND ART

For efficient performance of a wide variety of tasks, work vehicles such as agricultural tractors and industrial equipment have a large number of speeds. Usually, the operators of these vehicles prefer to have a large share of the forward speeds in the regular working zone of approximately five to fifteen kilometers per hour.

Often, these work vehicles use countershaft transmissions having numerous rotating components such as shafts, gears, clutches, and bearings. In the typical countershaft transmission, the power train includes a speed section connected to a range section. Commonly, the speed section precedes the range section and receives input power from the engine. The range section is used to select a range or series of operating speeds for the output power. For each selected setting of the range section, the speed section functions to select any one of the series of speeds.

There are many ways to improve the countershaft transmissions. By decreasing the change in energy level of the rotating components during a shift between different ranges, one can decrease the time required for the particular shift as well as increase the smoothness of the shift. Furthermore, by decreasing the number of components, one can decrease the amount of material required for assembling the transmission. Moreover, by increasing the compactness of the countershaft transmission, one can decrease the space required in the work vehicle for the transmission, thereby increasing the flexibility of fitting the transmission into the vehicle.

Currently, Funk Manufacturing Company produces and sells a countershaft transmission for agricultural tractors having eighteen forward speeds and nine reverse speeds. Seven of the forward speeds are included in the regular working zone. The transmission uses twenty-two gears and nine clutches arranged such that six clutches form the speed section and three clutches form the range section. Furthermore, one of the clutches is dedicated to providing a range containing exclusively the reverse speeds. Also, the shafts are staggered lengthwise with respect to each other such that they are supported for rotation by three walls that are assembled together to form the housing. The transmission is arranged so each gear ratio sequence is used exclusively either for decreasing, transmitting identical speed as, or increasing speed transmitted to the gear ratio sequence. A first range includes nine forward speeds. A second range includes nine forward speeds consecutive to the speeds of the first range. A third range includes nine reverse speeds. Therefore, a range shift between the forward speeds requires making the complete change in energy level between the different ranges.

U.S. Pat. No. 5,063,793 discloses a countershaft transmission having twenty-four forward speeds and twelve reverse speeds. Excluding an optional power takeoff, the preferred embodiment of the transmission uses twenty-five gears and ten clutches arranged such that six clutches form the speed section and four clutches form the range section. The six clutches of the speed section are each arranged to provide six forward speeds and three reverse speeds, so no range is dedicated to providing exclusively reverse speeds. Also, the shafts are staggered lengthwise with respect to each other. The transmission is arranged so each gear ratio sequence is used exclusively either for decreasing, transmitting identical speed as, or increasing speed transmitted to the gear ratio sequence. Each of the four ranges includes consecutive groups of six forward speeds and three reverse speeds. Therefore, a range shift requires making the complete change in energy level between the different ranges.

Even with the improvements that have been made in the countershaft transmissions of work vehicles such as agricultural tractors and industrial equipment, it is still desirable to provide further decreases in the change in energy level of the rotating components during a shift between different ranges, decreases in the number of components in the transmission, and increases in the compactness of the transmission.

SUMMARY OF INVENTION

One object of the invention is to decrease the change in energy level of the rotating components during a shift between the different ranges in a transmission having a large number of speeds.

Another object is to decrease the number of rotating components in a transmission having a large number of speeds.

A further object of the invention is to increase the compactness of a transmission having a large number of speeds.

Still another object of the present invention is to provide a large share of forward speeds in the regular working zone while increasing the compactness of a transmission.

According to the present invention, the foregoing and other objects and advantages are attained by a transmission including an input shaft, a plurality of countershafts, and an output shaft rotatably mounted in a housing. The input shaft has an input end for receiving input. An input gear is fixed to the input shaft. The output shaft has an output end for providing output. A fixed gear is fixed to the output shaft and each of the countershafts. At least one rotatable gear is rotatably mounted on the output shaft and each of the countershafts. Each rotatable gear is selectively fixed to its shaft by a respective clutch. A plurality of the rotatable gears form an input set that is meshed with the input gear. Any selected rotatable gear of the input set can be fixed to its shaft and drivingly connected to any selected one of a set of gear ratio combinations that are formed using a plurality of the gears in order to provide speeds at the output end of the output shaft for the output. A gear ratio sequence, formed by drivingly connecting a plurality of the gears, provides a decrease in speed for at least one of the gear ratio combinations and an increase in speed for at least one other of the gear ratio combinations.

In accordance with an aspect of the invention, a transmission has a speed section and a range section. A plurality of countershafts are designated as speed countershafts to form the speed section. First and second range countershafts and an output shaft form the range section. Through an arrangement of the speed section, any selected rotatable gear of an input set can be fixed to its shaft and drivingly connected to any selected one of a set of gear ratio speed combinations that are formed using a plurality of gears of the speed section in order to provide speed section results. Through an arrangement of the range section, the speed section results are drivingly connected to any selected one of a set of gear ratio range combinations that are formed using a plurality of gears of the range section in order to provide speeds at an output end of the output shaft for output. A middle range of speeds for the output includes at least one speed that is lower than at least one of a low range of speeds for the output and at least one other speed that is higher than at least one of a high range of speeds for the output.

In accordance with another aspect of the invention, a method of providing a plurality of speeds drivingly connects a plurality of gears to form a gear ratio sequence that is included in at least one gear ratio combination in order to provide a decrease in speed transmitted thereto and in at least one other gear ratio combination in order to provide an increase in speed transmitted thereto.

In accordance with a further aspect of the invention, a method of providing a plurality of speeds staggers at least one of a middle range of speeds with at least one of a low range of speeds and at least one other of the middle range of speeds with at least one of a high range of speeds.

Additional objects, advantages, and novel features of the invention will become apparent to those skilled in the art upon examination of the following detailed description of the preferred embodiments of the invention when read in conjunction with the accompanying drawings.

BRIEF DESCRIPTION OF THE DRAWINGS

FIG. 2, comprising

DETAILED DESCRIPTION OF THE PREFERRED EMBODIMENTS OF THE INVENTION

Figure 1:
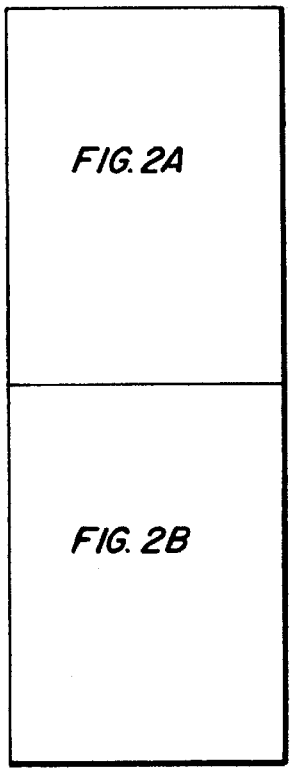
FIG. 1 is a schematic illustration showing the interrelationship between FIGS. 2A and 2B.
Figure 2A:
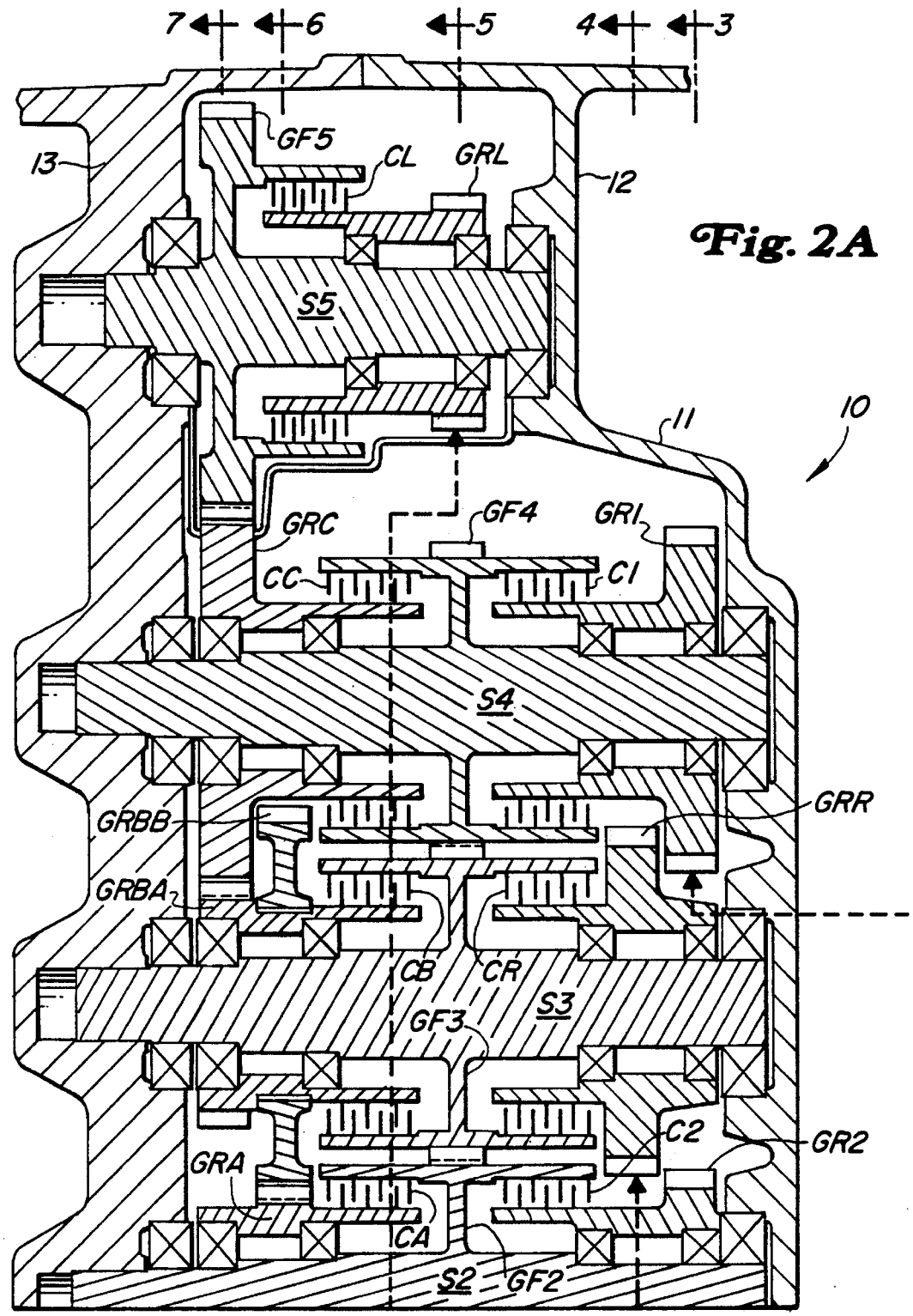
FIGS. 2A and 2B, is a sectional side map view showing a transmission constructed according to the present invention.
Figure 2B:
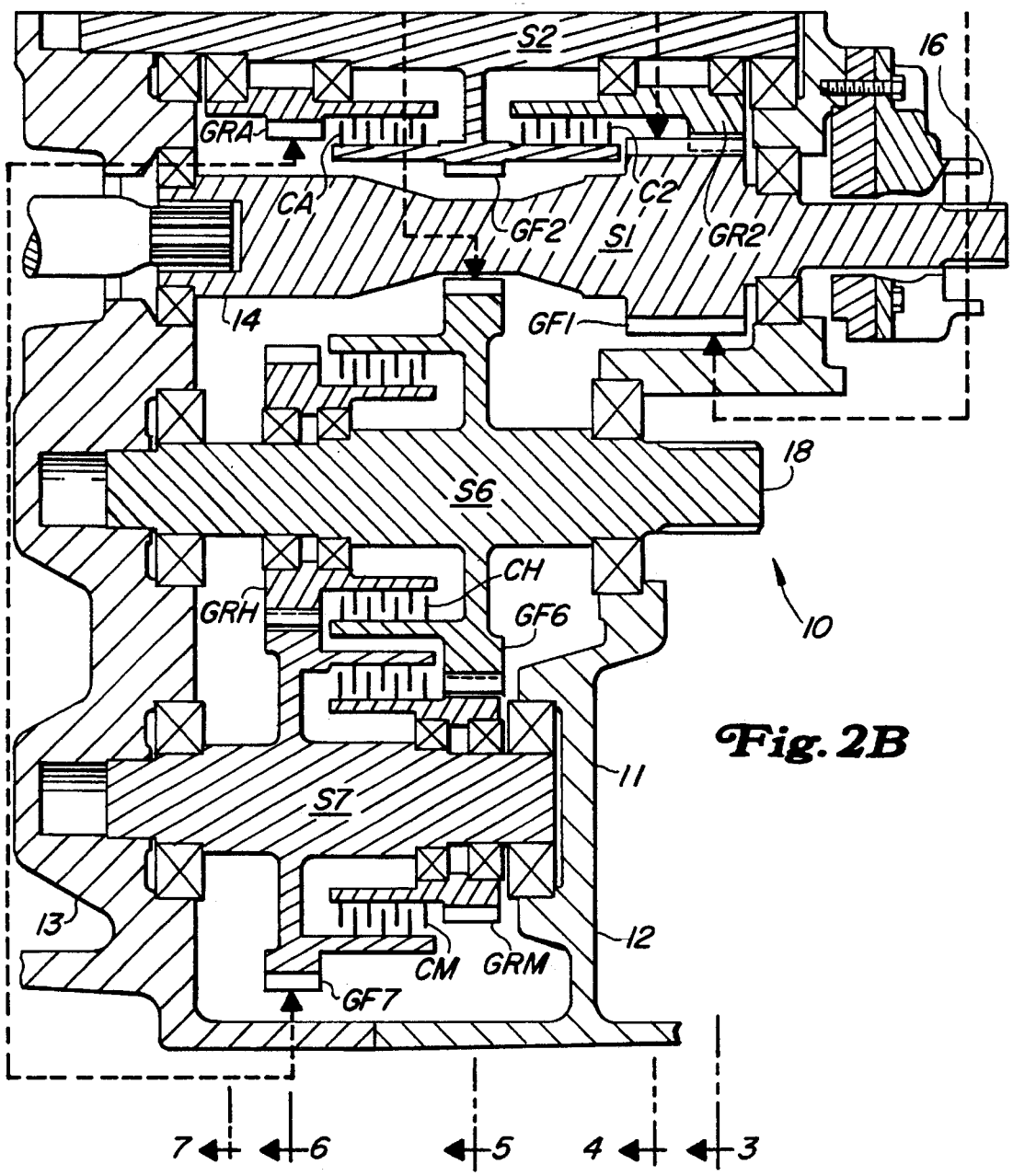

In the description below, the reader is assumed to understand the FIG. 1 illustration of the interrelationship between FIGS. 2A and 2B, which comprise FIG. 2.

For clarity in the description below, references for shafts begin with the reference letter S and conclude with a reference numeral. Each of the references for fixed gears, that is, gears integrally formed with or otherwise fixed to their shafts, begins with the reference letters GF and concludes with the reference numeral of its corresponding shaft. For example, fixed gear GF1 would be fixed to shaft S1. References for rotatable gears, that is, gears that optionally can either rotate on their shafts or else be fixed to their shafts by their corresponding clutches, begin with the reference letters GR. Each of the references for the clutches begins with the reference letter C and concludes with either a reference numeral or letter. In order to indicate the interrelationship between the rotatable gears and their corresponding clutches, the remainder of each of the references for the rotatable gears includes the concluding reference numeral or letter of its corresponding clutch. For example, rotatable gear GR1 would correspond to clutch C1 and rotatable gear GRA would correspond to clutch CA. Each of the references for multiple rotatable gears corresponding to the same clutch concludes with a sequential reference letter. For example, rotatable gears GRBA and GRBB would correspond to clutch CB.

FIG. 2 shows a transmission 10 including a housing 11 that supports a plurality of rotatable shafts, gears, clutches, and bearings. The shafts are aligned parallel with one another and supported for rotation by two walls 12, 13 that are assembled together to form the housing 11.

Input shaft S1 is rotatably mounted in the housing 11 and has an input end 14 for receiving input power. A fixed input gear GF1 is fixed to the input shaft S1. In the preferred embodiment, the fixed input gear GF1 is formed integrally with the input shaft S1. Furthermore, the input shaft S1 preferably has a takeoff end 16 for providing takeoff power that can be used in known ways to power various implements or accessories which are commonly utilized in conjunction with work vehicles such as tractors.

Rotatably mounted in the housing 11 are countershafts S2, S3, S4, S5, output shaft S6, and countershaft S7. Fixed gears GF2, GF3, GF4, GF5, GF6, GF7 are fixed, such as by welding, to their corresponding shafts S2, S3, S4, S5, S6, S7. Rotatable gears GR1, GR2, GRR, GRA are rotatably mounted on and selectively fixed to their corresponding shafts S4, S2, S3, S2 by respective clutches C1, C2, CR, CA. Rotatable gears GRBA, GRBB are rotatably mounted on and selectively fixed to their shaft S3 by clutch CB. Preferably, the rotatable gears GRBA, GRBB are formed as a double gear, as shown in FIG. 2. Rotatable gears GRC, GRL, GRM, GRH are rotatably mounted on and selectively fixed to their corresponding shafts S4, S5, S7, S6 by respective clutches CC, CL, CM, CH. The output shaft S6 has an output end 18 for providing output power.

Figure 3:
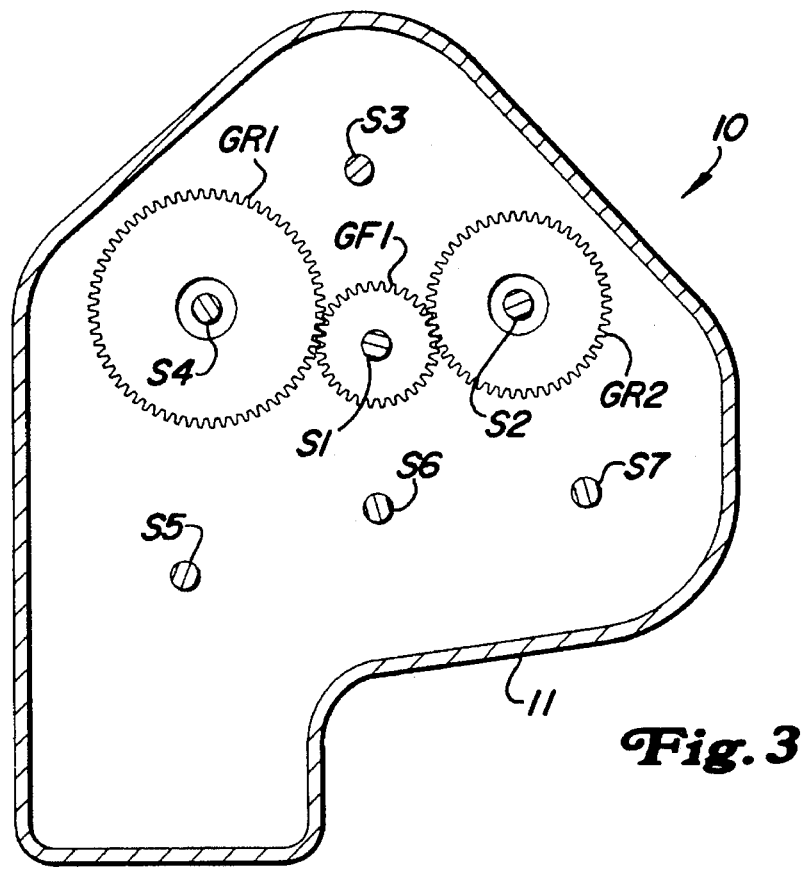
Figure 4:
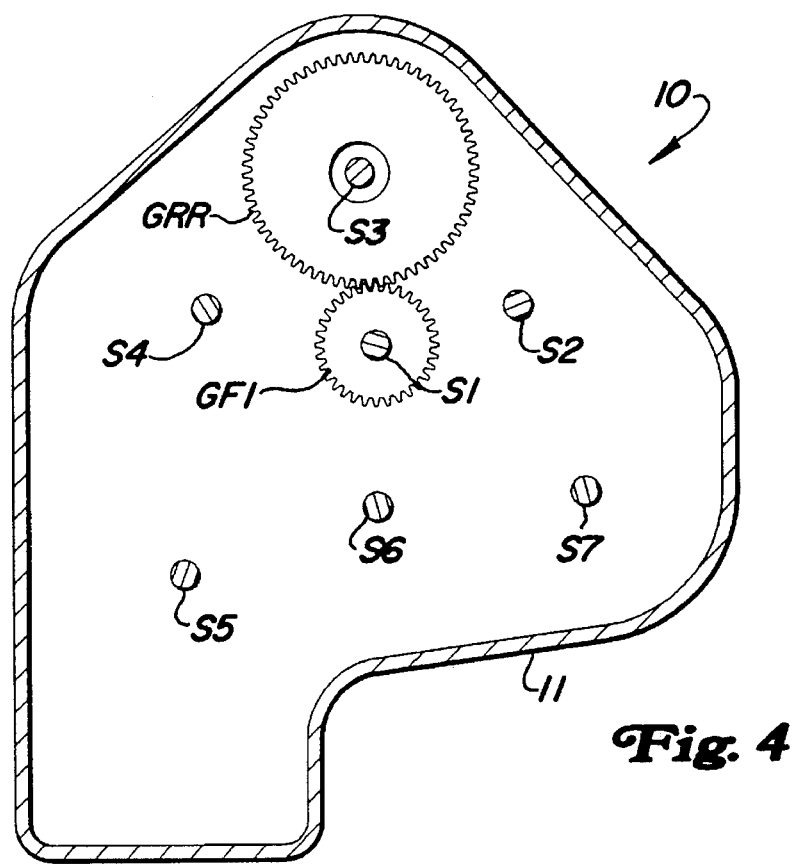

As shown in FIGS. 3 through 7, the input shaft S1 is positioned somewhat centrally in a roundish arrangement of the countershafts S2, S3, S4, S5, the output shaft S6, and the countershaft S7, listed in the order of their counterclockwise appearance in the arrangement starting with the countershaft S2. As shown in FIGS. 2 through 4, the input gear GF1 is meshed with the rotatable gears GR1, GR2, GRR that form an input set of the rotatable gears.

As can be determined from FIGS. 2, 3, and 4, the clutches C1, C2, CR can selectively fix one of the input set of the rotatable gears GR1, GR2, GRR to its corresponding shaft S4, S2, S3, respectively, in order to receive from the input gear GF1 speed derived from the input power and transmit a result of this speed to selected gear ratio combinations of the gears GF2, GF3, GF4, GF5, GF6, GF7, GRA, GRBA, GRBB, GRC, GRL, GRM, GRH in order to provide any selected one of a number of speeds at the output end 18 of the output shaft S6 for the output power. The gear ratio combinations are distinct because of the gears actually being drivingly connected.

The gears are drivingly connected to form the gear ratio combinations. Such driving connection can involve direct meshing of the gears fixed to their shafts or else rotatably mounted on their shafts, with or without activation of one or more of their respective clutches. Additionally, the driving connection can involve one or more of the gears fixed to the same shaft or rotatably mounted on the same shaft, with activation of their respective clutches.

The transmission 10 is arranged in a speed section and a range section. The shafts S2, S3, S4, the gears GF2, GF3, GF4, GR1, GR2, GRR, GRA, GRBA, GRBB, GRC, and the clutches C1, C2, CR, CA, CB, CC form the speed section. The shafts S5, S6, S7, the gears GF5, GF6, GF7, GRL, GRM, GRH, and the clutches CL, CM, CH form the range section.

The speed section receives the speed derived from the input power by using the clutches C1, C2, CR to selectively fix one of their respective rotatable gears GR1, GR2, GRR of the input set to its corresponding one of the shafts S4, S2, S3, as can be determined from FIGS. 2, 3, and 4. Whenever one of the clutches C1, C2, CR is activated in order to receive the speed derived from the input power, then one of the clutches CA, CB, CC is also activated in order to transmit a selected one of a set of speed section results of the speed derived from the input power to the range section at one of the gears GRA, GRC through a selected one of a set of gear ratio speed combinations that are formed using the gears GF2, GF3, GF4, GR1, GR2, GRR, GRA, GRBA, GRBB, GRC of the speed section, as can be determined from FIGS. 2, 6, and 7.

Figure 7:
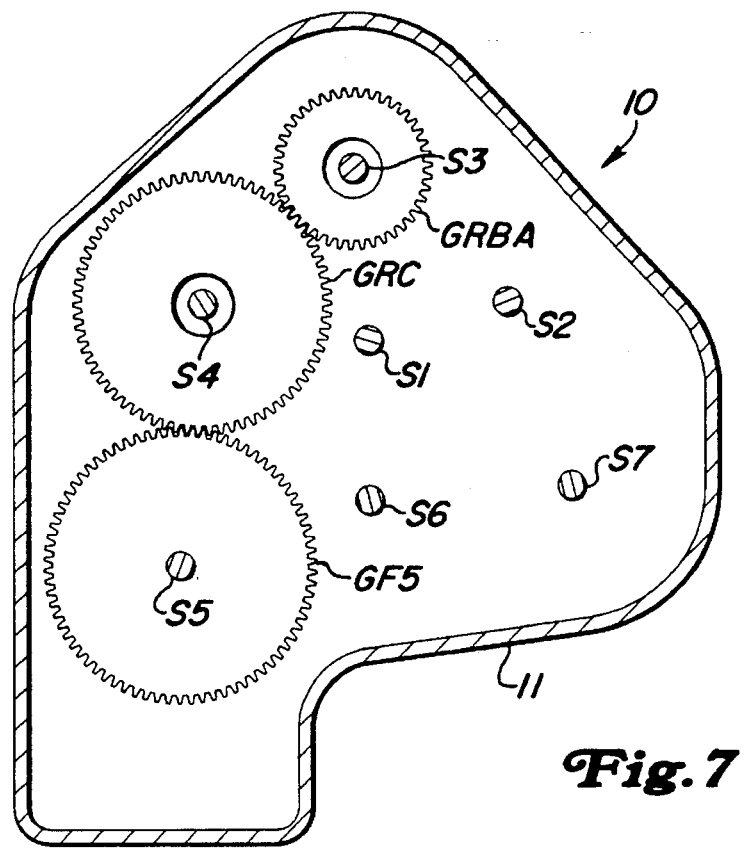
FIGS. 3 through 7 are fragmentary representations oriented along lines 3—3 through 7—7, respectively, of FIG. 2.
Figure 5:
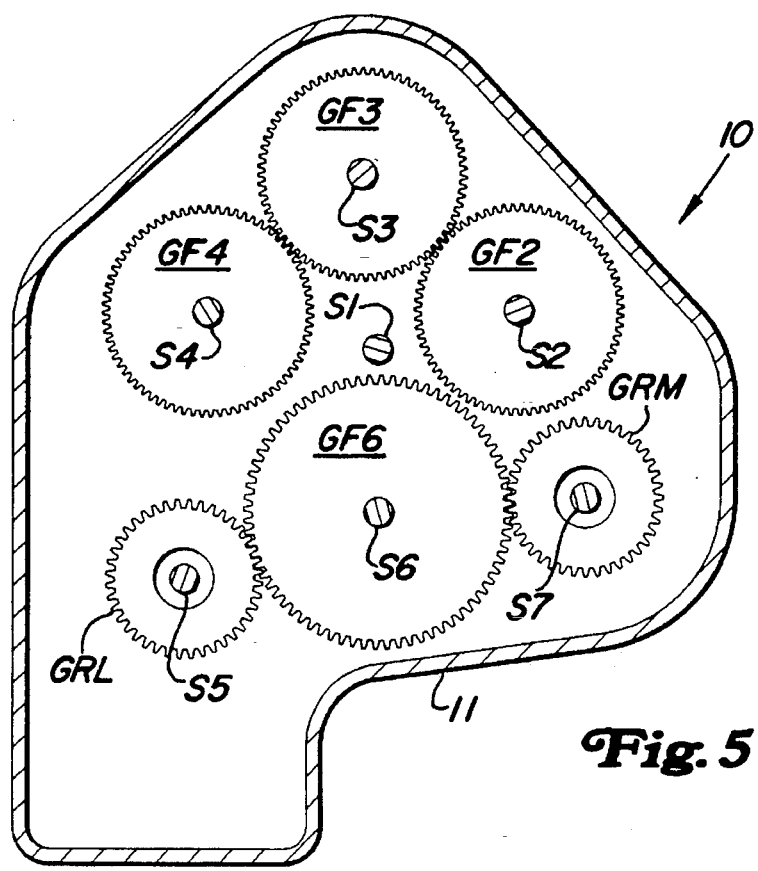
Figure 6:
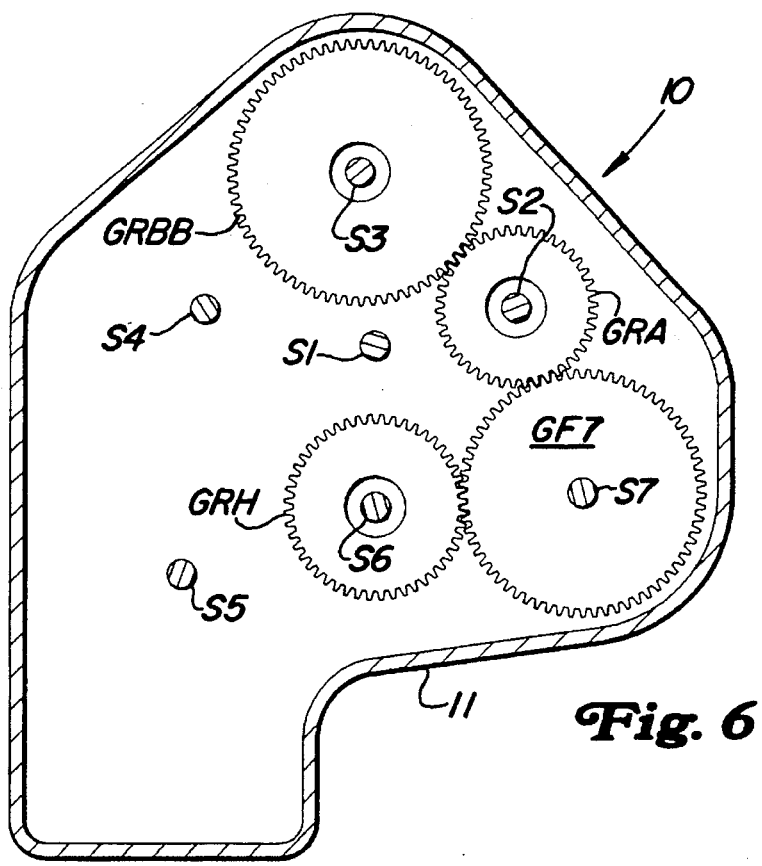

The range section receives the speed section results of the speed derived from the input power by using the one of the rotatable gears GRA, GRC to drive a selected gear ratio range combination of the gears GF5, GF6, GF7, GRL, GRM, GRH of the range section in order to provide the output power. In the preferred embodiment, activation of the clutch CL selects a low range of speeds for the output power so the gear GF5, drivingly connected to the gear GRL, receives the speed section result from the gear GRC of the speed section, as shown in FIGS. 2, 5, and 7. Further, activation of one of the clutches CM, CH selects a corresponding middle or high range of speeds for the output power so the gear GF7, drivingly connected to the fixed one of the gears GRM, GRH, receives the speed section result from the gear GRA of the speed section, as shown in FIGS. 2, 5, and 6.

The low range of speeds, selected by activating the clutch CL, includes the lowest of the speeds for the output power. The high range of speeds, selected by activating the clutch CH, includes the highest of the speeds for the output power. The middle range of speeds, selected by activating the clutch CM, overlaps the low and high ranges of speeds. In particular, the middle range of speeds includes at least one of the speeds for the output power that is lower than at least one of the speeds of the low range of speeds and at least one other of the speeds for the output power that is higher than at least one of the speeds of the high range of speeds. As discussed below, this overlapping of the middle range of speeds with the low and high ranges of speeds provides the operator of the work vehicle with a large share of the speeds in the regular working zone. Furthermore, the operator can shift between successive speeds that appear in the different ranges of speeds without making the complete change in energy level between the different ranges.

The gear ratio combinations of the gears of the speed and range sections depend upon the preselected meshing of the gears, the selective activation of the clutches, and the preselected tooth count for each of the gears. As shown in FIGS. 2 through 4, the input gear GF1 is meshed with the rotatable gears GR1, GR2, GRR of the input set. As shown in FIGS. 2 and 5, the fixed gear GF3 is meshed with the fixed gears GF2, GF4. Formed as the double gear shown in FIGS. 2, 6, and 7, the rotatable gears GRBA, GRBB together are rotatably mounted on the shaft S3 and selectively fixed to the shaft S3 by activation of the clutch CB. As shown in FIGS. 2 and 6, the rotatable gear GRA is meshed with the rotatable gear GRBB and the fixed gear GF7, which in turn is meshed with the rotatable gear GRH. As shown in FIGS. 2 and 7, the rotatable gear GRC is meshed with the rotatable gear GRBA and the fixed gear GF5. As shown in FIGS. 2 and 5, the fixed gear GF6 is meshed with the rotatable gears GRL, GRM. The gear ratio obtained by meshing any pair of the gears GF1, GF2, GF3, GF4, GF5, GF6, GF7, GR1, GR2, GRR, GRA, GRBA, GRBB, GRC, GRL, GRM, GRH is a function of the corresponding tooth counts. In the preferred embodiment, the gears shown in FIG. 2 have the tooth counts indicated below in Table 1.

TABLE 1

| Gear | Tooth Count | Gear | Tooth Count | Gear | Tooth Count |
| --- | --- | --- | --- | --- | --- |
| GF1 | 32 | GF7 | 65 | GRBB | 70 |
| GF2 | 71 | GR1 | 62 | GRC | 70 |
| GF3 | 71 | GR2 | 48 | GRL | 40 |
| GF4 | 71 | GRR | 62 | GRM | 40 |
| GF5 | 74 | GRA | 42 | GRH | 48 |
| GF6 | 72 | GRBA | 42 | | |

As will be well understood by those skilled in the art, one can obtain the desired speed for the output by selectively combining the gear ratios of drivingly connected pairs of the gears GF1, GF2, GF3, GF4, GF5, GF6, GF7, GR1, GR2, GRR, GRA, GRBA, GRBB, GRC, GRL, GRM, GRH. Further, the gear ratios of the drivingly connected gears and the position of the double gear formed using the gears GRBA, GRBB are depicted according to design considerations reflecting the speeds preferred by the manufacturer, seller, purchaser, and operator of the work vehicle.

In the preferred embodiment, the clutches C1, C2, CR, CA, CB, CC, CL, CM, CH are selectively activated as indicated below in Table 2 to fix their respective gears to their corresponding shafts in order to receive the speed derived from the input power and provide the output power. Those skilled in the art will understand the values indicated in Table 2 for approximate kilometers per hour (approx. k.p.h.) help describe the present invention, but are only representative and will vary depending upon wheel size, axle ratio, and other characteristics of the work vehicle.

TABLE 2

| | Range | | | Clutches Activated | | | | | | | | | Gear | Approx. |
| --- | --- | --- | --- | --- | --- | --- | --- | --- | --- | --- | --- | --- | --- | --- |
| Speed | Low | Middle | High | C1 | C2 | CR | CA | CB | CC | CL | CM | CH | Ratio | k.p.h. |
| F1 | L | | | C1 | | | CA | | | CL | | | −10.241 | 2.4 |
| F2 | L | | | | C2 | | CA | | | CL | | | −7.929 | 3.1 |
| F3 | L | | | C1 | | | | CB | | CL | | | −6.145 | 4.0 |
| F4 | | M | | C1 | | | CA | | | | CM | | −5.397 | 4.6 |
| F5 | L | | | | C2 | | | CB | | CL | | | −4.757 | 5.2 |
| F6 | | M | | | C2 | | CA | | | | CM | | −4.179 | 5.9 |
| F7 | L | | | C1 | | | | | CC | CL | | | −3.687 | 6.7 |
| F8 | | M | | C1 | | | | CB | | | CM | | −3.238 | 7.6 |
| F9 | L | | | | C2 | | | | CC | CL | | | −2.854 | 8.7 |

TABLE 2-continued

| Speed | Range | | | Clutches Activated | | | | | | | | | Gear Ratio | Approx. k.p.h. |
|---|---|---|---|---|---|---|---|---|---|---|---|---|---|---|
| | Low | Middle | High | C1 | C2 | CR | CA | CB | CC | CL | CM | CH | | |
| F10 |  | M |  |  | C2 |  |  | CB |  |  | CM |  | −2.507 | 9.8 |
| F11 |  |  | H | C1 |  |  | CA |  |  |  |  | CH | −2.214 | 11.1 |
| F12 |  | M |  | C1 |  |  |  |  | CC |  | CM |  | −1.943 | 12.7 |
| F13 |  |  | H |  | C2 |  | CA |  |  |  |  | CH | −1.714 | 14.4 |
| F14 |  | M |  |  | C2 |  |  |  | CC |  | CM |  | −1.504 | 16.4 |
| F15 |  |  | H | C1 |  |  |  | CB |  |  |  | CH | −1.329 | 18.6 |
| F16 |  |  | H |  | C2 |  |  | CB |  |  |  | CH | −1.029 | 24.0 |
| F17 |  |  | H | C1 |  |  |  |  | CC |  |  | CH | −0.797 | 31.0 |
| F18 |  |  | H |  | C2 |  |  |  | CC |  |  | CH | −0.617 | 40.0 |
| R1 | L |  |  |  |  | CR | CA |  |  | CL |  |  | 10.241 | 2.4 |
| R2 | L |  |  |  |  | CR |  | CB |  | CL |  |  | 6.145 | 4.0 |
| R3 |  | M |  |  |  | CR | CA |  |  |  | CM |  | 5.397 | 4.6 |
| R4 | L |  |  |  |  | CR |  |  | CC | CL |  |  | 3.687 | 6.7 |
| R5 |  | M |  |  |  | CR |  | CB |  |  | CM |  | 3.238 | 7.6 |
| R6 |  |  | H |  |  | CR | CA |  |  |  |  | CH | 2.214 | 11.1 |
| R7 |  | M |  |  |  | CR |  |  | CC |  | CM |  | 1.943 | 12.7 |
| R8 |  |  | H |  |  | CR |  | CB |  |  |  | CH | 1.329 | 18.6 |
| R9 |  |  | H |  |  | CR |  |  | CC |  |  | CH | 0.797 | 31.0 |

As indicated in Tables 1 and 2, the transmission 10 provides eighteen forward speeds and nine reverse speeds using the seventeen gears and the nine clutches. As discussed above, the six clutches C1, C2, CR, CA, CB, CC form the speed section and the three clutches CL, CM, CH form the range section.

The gear ratio for each of the speeds represents the revolutions made by the input shaft S1 relative to the revolutions made by the output shaft S6. A negative gear ratio indicates the output shaft S6 rotates in the opposite direction from the input shaft S1 and corresponds to one of the forward speeds, as indicated in Table 2. Further, a positive gear ratio indicates the output shaft S6 rotates in the same direction as the input shaft S1 and corresponds to one of the reverse speeds. For exemplary purposes, the input shaft S1 is considered as consistently rotating in the counterclockwise direction. Therefore, the clockwise direction corresponds to the forward speeds and the counterclockwise direction corresponds to the reverse speeds.

As indicated in Table 2, the invention provides a large share of the forward speeds, including the nine forward speeds F5, F6, F7, F8, F9, F10, F11, F12, F13, in the regular working zone of approximately five to fifteen k.p.h. This results from the overlapping of the middle range with the low and high ranges. Namely, the regular working zone includes the forward speeds F5, F7, F9 from the low range of speeds, the forward speeds F6, F8, F10, F12 from the middle range of speeds, and the forward speeds F11, F13 from the high range of speeds.

In the preferred embodiment, the forward speeds F4, F6, F8 of the middle range of speeds are staggered with the forward speeds F5, F7, F9 of the low range of speeds. Further, the forward speeds F12, F14 of the middle range of speeds are staggered with the forward speeds F11, F13 of the high range of speeds. Therefore, the operator of the work vehicle can shift between the ranges of the forward speeds without having to undergo the complete change in energy level between the different ranges. For instance, the operator can shift directly from the forward speed F3 of the low range of speeds to the successive forward speed F4 of the middle range of speeds without having to first complete the change in energy level between the low and middle ranges.

The activation of the clutches controls the speed of the rotating components. Moreover, the difference between the speeds of the rotating components determines the change in energy level resulting from a shift between the forward or reverse speeds. As indicated in Table 2, activation of the clutches C1, CB, CL determines the speed of the rotating components for the forward speed F3 of the low range of speeds. Further, activation of the clutches C1, CA, CM determines the speed of the rotating components for the forward speed F4 of the middle range of speeds. A range shift between the forward speeds F3, F4 results in a small change in energy level of the rotating components because the low and middle ranges are overlapped. Furthermore, range shifts in the transmission 10 between the successive speeds result in small changes in energy level of the rotating shafts, gears, clutches, and bearings because the low, middle, and high ranges are overlapped.

Desirably, the work vehicle undergoes a smoother range shift by undertaking a smaller change in energy level of the rotating components. So, the range shift between the speeds F3, F4 is smooth. Also, the range shifts between the other successive forward speeds from the different ranges is smooth. Moreover, the decreases in the change in energy level for the range shifts result in decreases in the time required for making the shifts.

Additionally, the reverse speed R3 of the middle range of speeds is staggered with the reverse speed R4 of the low range of speeds. Plus, the reverse speed R7 of the middle range of speeds is staggered with the reverse speed R6 of the high range of speeds. Similarly to the range shifts between the successive forward speeds discussed above, the operator can make range shifts between the successive reverse speeds without having to complete the changes in energy level between the different ranges.

A gear ratio sequence is formed by drivingly connecting a plurality of the gears. The gear ratio sequence is used in at least one of the gear ratio combinations in order to provide a reduction or decrease in speed transmitted to the gear ratio sequence and in at least one other of the gear ratio combinations in order to provide an increase in speed transmitted to the gear ratio sequence. In the preferred embodiment, the rotatable gears GRA, GRBB, GRBA, GRC are drivingly connected to form a gear ratio sequence that is ridden over alternatively back or forth in order to provide the desired decrease or increase in speed for the gear ratio combinations of the forward speeds F1, F2, F12, F14, F17, F18 and the reverse speeds R1, R7, R9, as can be understood from FIGS. 2 through 7 and Table 2.

On one hand, through activation of the clutches CA, CL, the rotatable gears GRA, GRBB, GRBA, GRC are drivingly connected to form a gear ratio sequence that provides the desired decrease in speed transmitted to this gear ratio sequence for the gear ratio combinations of the speeds F1, F2, R1. The magnitude of this gear ratio sequence based upon the tooth counts of the rotatable gears GRA, GRBB, GRBA, GRC preferably is (70/42)(70/42) for the decrease in speed, as can be determined from Table 1.

On the other hand, through activation of the clutches CC, CM or the clutches CC, CH, the rotatable gears GRA, GRBB, GRBA, GRC are drivingly connected in the opposite direction, namely, GRC, GRBA, GRBB, GRA, to form an opposite gear ratio sequence. This gear ratio sequence of the rotatable gears GRC, GRBA, GRBB, GRA is used to provide the desired increase in speed transmitted to this gear ratio sequence for the gear ratio combinations of the speeds F12, F14, F17, F18, R7, R9. The magnitude of this gear ratio sequence based upon the tooth counts of the rotatable gears GRC, GRBA, GRBB, GRA preferably is (42/70)(42/70) for the increase in speed, as can be determined from Table 1.

By reusing the rotatable gears GRA, GRBB, GRBA, GRC to provide both the desired decrease in the speeds F1, F2, R1 and also the desired increase in the speeds F12, F14, F17, F18, R7, R9, the transmission 10 decreases the number of gears required for providing the speeds for the output power. Moreover, because fewer gears must be formed, less material is required for assembling the transmission 10. Additionally, fewer gears rotate throughout the transmission 10, so there is less momentum built up and a decrease in the change in energy level of the components during shifts. Furthermore, because of this decrease in the change in energy level of the rotating shafts, gears, clutches, and bearings, there is a decrease in the time required for the range shifts and an increase in the smoothness of these shifts.

The reuse of the rotatable gears GRA, GRBB, GRBA, GRC not only results in the use of fewer total gears but also permits the shafts S1, S2, S3, S4, S5, S6, S7, which support all the gears of the transmission 10, to be supported for rotation by the two walls 12, 13 that are assembled together to form the housing 11. By reusing the gears GRA, GRBB, GRBA, GRC, the transmission 10 permits the shafts S1, S2, S3, S4, S5, S6, S7 to be aligned parallel with one another in the passage or volume defined by the walls 12, 13. Therefore, the reuse of the rotatable gears GRA, GRBB, GRBA, GRC increases the compactness of the transmission 10 and decreases the resulting space requirements in the work vehicle.

From this disclosure showing and describing a specific embodiment of the invention, various obvious modifications of the invention will become apparent to those skilled in the art and can be made without departing from the spirit or scope of the invention. For example, through an arrangement of shafts, gears, and clutches, the range section could precede the speed section such that the range section receives the input power, the speed section receives range section results of the input power, and the speed section provides the output power. Additionally, one could stagger at least one of the high range of speeds for the output power with at least one of the low range of speeds for the output power. Furthermore, the staggering of the middle range of speeds for the output power with the low and high ranges of speeds for the output power could involve any assortment of interspersions of the speeds, with various degrees of consistency and symmetry. Moreover, one could preselect the gear ratios such that any one of the low, middle, and high ranges of speeds could be selected by activation of any one of the clutches CL, CM, CH. Also, one could vary the preselected gear ratios of the drivingly connected gears as well as the position of the double gear formed using the gears GRBA, GRBB. Because of the possible variations in the invention described above, the invention should not be limited to the detailed description or the specific illustrations, but only to the fair scope of the following claims.

What is claimed is:

1. In a transmission including a housing, an input shaft rotatably mounted in the housing and having an input end for receiving input, an input gear fixed to the input shaft, an output shaft rotatably mounted in the housing and having an output end for providing output, and a plurality of countershafts rotatably mounted in the housing, the output shaft and each of the countershafts having a fixed gear fixed thereto and at least one rotatable gear rotatably mounted thereon and selectively fixed thereto by a respective clutch, the rotatable gears including an input set meshed with the input gear; the shafts, gears, and clutches being arranged to fix any selected one of the input set of the rotatable gears to its shaft by its respective clutch and drivingly connect thereto any selected one of a set of gear ratio combinations that are formed using a plurality of the gears to provide a plurality of speeds at the output end of the output shaft for the output, the improvement comprising:

a plurality of the gears being drivingly connected to form a gear ratio sequence that is included in at least one of the gear ratio combinations in order to provide a decrease in speed transmitted thereto and in at least one other of the gear ratio combinations in order to provide an increase in speed transmitted thereto.

2. The improvement of claim 1, wherein:

the gear ratio sequence includes a plurality of the rotatable gears in mesh.

3. The improvement of claim 1, wherein:

there are at least four rotatable gears rotatably mounted on the shafts; and the gear ratio sequence includes at least four of the rotatable gears.

4. The improvement of claim 3, wherein:

two pairs of the rotatable gears of the gear ratio sequence are meshed; and one of the rotatable gears from each of the pairs is rotatably mounted on the same shaft.

5. The improvement of claim 4, wherein:

each of the one of the rotatable gears from each of the pairs rotatably mounted on the same shaft is selectively fixed thereto by the same clutch.

6. The improvement of claim 3, wherein:

two of the rotatable gears of the gear ratio sequence are formed as a double gear.

7. The improvement of claim 1, wherein:

the speeds for the output include a plurality of clockwise and counterclockwise speeds.

8. The improvement of claim 1, wherein:

the input shaft has a takeoff end for providing takeoff.

9. In a transmission including a housing, an input shaft rotatably mounted in the housing and having an input end for receiving input, an input gear fixed to the input shaft, a speed section having a plurality of speed countershafts rotatably mounted in the housing, and a range section having an output shaft rotatably mounted in the housing and with an output end for providing output, the range section having first and second range countershafts rotatably mounted in the housing, the output shaft and each countershaft having a fixed gear fixed thereto and at least one rotatable gear rotatably mounted thereon and selectively fixed thereto by a respective clutch, the rotatable gears of the speed section including an input set meshed with the input gear; the speed section being arranged to fix any selected one of the input set of the rotatable gears to its shaft by its respective clutch and drivingly connect thereto any selected one of a set of gear ratio speed combinations that are formed using a plurality of the gears of the speed section to provide a plurality of speed section results; the range section being arranged to receive the speed section results by drivingly connecting thereto any selected one of a set of gear ratio range combinations that are formed using a plurality of the gears of the range section to provide at least six speeds at the output end of the output shaft for the output, the improvement comprising:

- a low range of speeds for the output being provided by one of the at least one rotatable gears rotatably mounted on the first range countershaft being selectively fixed thereto by its respective clutch to form its gear ratio range combination, the low range of speeds including the lowest of the speeds for the output;
- a high range of speeds for the output being provided by one of the at least one rotatable gears rotatably mounted on the output shaft being selectively fixed thereto by its respective clutch to form its gear ratio range combination, the high range of speeds including the highest of the speeds for the output; and
- a middle range of speeds for the output being provided by one of the at least one rotatable gears rotatably mounted on the second range countershaft being selectively fixed thereto by its respective clutch to form its gear ratio range combination, the middle range of speeds including at least one of the speeds for the output that is lower than at least one of the low range of speeds and at least one other of the speeds for the output that is higher than at least one of the high range of speeds.

10. The improvement of claim 9, wherein:

the input set of the rotatable gears includes at least one of the rotatable gears rotatably mounted on each of the speed countershafts.

11. The improvement of claim 9, wherein:

there are at least three speed countershafts.

12. The improvement of claim 9, wherein:

a plurality of rotatable gears are rotatably mounted on each of the speed countershafts and selectively fixed thereto by a respective plurality of clutches.

13. The improvement of claim 9, wherein:

the speeds for the output include at least twelve clockwise speeds;

the middle and low ranges of speeds each include at least three clockwise speeds that are staggered with each other; and the middle range of speeds includes at least two other clockwise speeds that are staggered with a respective at least two clockwise speeds of the high range of speeds.

14. The improvement of claim 13, wherein:

the speeds for the output include at least six counterclockwise speeds;

the middle range of speeds includes at least one counterclockwise speed that is staggered with at least one counterclockwise speed of the low range of speeds; and the middle range of speeds includes at least one other counterclockwise speed that is staggered with at least one counterclockwise speed of the high range of speeds.

15. The improvement of claim 14, wherein:

the speeds for the output include at least eighteen clockwise speeds and at least nine counterclockwise speeds.

16. The improvement of claim 9, wherein:

the input shaft has a takeoff end for providing takeoff.

17. A method of providing a plurality of speeds at an output end of an output shaft for output using a rotatable input shaft having an input end for receiving input, an input gear fixed to the input shaft, and a plurality of rotatable countershafts, the output shaft and each countershaft having a fixed gear fixed thereto and at least one rotatable gear rotatably mounted thereon and selectively fixed thereto, the rotatable gears including an input set meshed with the input gear; the shafts and gears being arranged to fix any selected one of the input set of the rotatable gears to its shaft and drivingly connect thereto any selected one of a set of gear ratio combinations that are formed using a plurality of the gears, the method comprising the step of:

drivingly connecting a plurality of the gears to form a gear ratio sequence that is included in at least one of the gear ratio combinations in order to provide a decrease in speed transmitted thereto and in at least one other of the gear ratio combinations in order to provide an increase in speed transmitted thereto.

18. A method of providing a plurality of speeds at an output end of an output shaft for output using a rotatable input shaft having an input end for receiving input, an input gear fixed to the input shaft, and a plurality of rotatable countershafts, the output shaft and each countershaft having a fixed gear fixed thereto and at least one rotatable gear rotatably mounted thereon and selectively fixed thereto, the rotatable gears including an input set meshed with the input gear; the shafts and gears being arranged to fix any selected one of the input set of the rotatable gears to its shaft and drivingly connect thereto any selected one of a set of gear ratio combinations that are formed using a plurality of the gears; the speeds for the output including at least six speeds arranged in a low range of speeds that includes the lowest of the speeds for the output, a high range of speeds that includes the highest of the speeds for the output, and a middle range of speeds, the method comprising the steps of:

staggering at least one of the middle range of speeds with at least one of the low range of speeds; and staggering at least one other of the middle range of speeds with at least one of the high range of speeds.

19. The method of claim 18, wherein:

the speeds for the output include at least twelve clockwise speeds, and further comprising the steps of:

staggering at least three clockwise speeds of the middle range of speeds with a respective at least three clockwise speeds of the low range of speeds; and staggering at least two other clockwise speeds of the middle range of speeds with a respective at least two clockwise speeds of the high range of speeds.

20. The method of claim 19, wherein:

the speeds for the output include at least six counterclockwise speeds, and further comprising the steps of:

staggering at least one counterclockwise speed of the middle range of speeds with at least one counterclockwise speed of the low range of speeds; and staggering at least one other counterclockwise speed of the middle range of speeds with at least one counterclockwise speed of the high range of speeds.

21. In a transmission including a housing, an input shaft rotatably mounted in the housing and having an input end for receiving input, an input gear fixed to the input shaft, a speed section having at least one speed countershaft rotatably mounted in the housing, and a range section having an output shaft with an output gear fixed thereto rotatably mounted in the housing and with an output end for providing output, the range section having at least one range countershaft rotatably mounted in the housing, each of the at least one speed and range countershafts having a fixed gear fixed thereto and at least one rotatable gear rotatably mounted thereon and selectively fixed thereto by a respective clutch, the shafts, gears, and clutches being arranged to drivingly connect thereto any selected one of a set of gear ratio combinations that are formed using a plurality of the gears to provide a plurality of speeds at the output end of the output shaft for the output, the improvement comprising:

a plurality of the gears being drivingly connected to form a gear ratio sequence that is included in at least one of the gear ratio combinations in order to provide a decrease in speed transmitted thereto and in at least one other of the gear ratio combinations in order to provide an increase in speed transmitted thereto.

22. In a transmission including a housing, an input shaft rotatably mounted in the housing and having an input end for receiving input, an input gear fixed to the input shaft, a speed section having at least one speed countershaft rotatably mounted in the housing, and a range section having at least one range countershaft rotatably mounted in the housing, each of the at least one of the speed and range countershafts having a fixed gear fixed thereto and at least one rotatable gear rotatably mounted thereon and selectively fixed thereto by a respective clutch, an output shaft with an output gear fixed thereon rotatably mounted in the housing and having an output end for providing output, the shafts, gears, and clutches being arranged to drivingly connect thereto any selected one of a set of gear ratio combinations that are formed using a plurality of the gears to provide a plurality of speeds within each of a low, middle and high range, the improvement comprising:

the low range of speeds including the lowest of the speeds for the output;

the high range of speeds including the highest of the speeds for the output; and the middle range of speeds includes at least one of the speeds for the output that is lower than at least one of the low range of speeds and at least one other of the speeds for the output that is higher than at least one of the high range of speeds.

* * * * *